(12) United States Patent
Wilke et al.

(10) Patent No.: US 8,511,737 B2
(45) Date of Patent: Aug. 20, 2013

(54) LOCKING APPARATUS WITH SENSOR FOR A FOLDING TOP

(75) Inventors: Gunnar Wilke, Lotte (DE); Christof Blech, Rennigen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 126 days.

(21) Appl. No.: 13/227,675

(22) Filed: Sep. 8, 2011

(65) Prior Publication Data

US 2012/0086230 A1  Apr. 12, 2012

(30) Foreign Application Priority Data

Sep. 8, 2010 (DE) .......................... 10 2010 044 704

(51) Int. Cl.
*B60J 7/185* (2006.01)
(52) U.S. Cl.
USPC ........... 296/121; 296/128; 296/224; 292/256; 292/DIG. 5
(58) Field of Classification Search
USPC ................. 296/100.04, 100.07, 100.16, 121, 296/128, 224; 292/95, 96, 201, 216, 256; 292/DIG. 4, DIG. 5
See application file for complete search history.

(56) References Cited

U.S. PATENT DOCUMENTS

| | | | |
|---|---|---|---|
| 4,817,999 A | 4/1989 | Drew | |
| 5,058,939 A | 10/1991 | Miilu | |
| 5,222,775 A * | 6/1993 | Kato | 292/201 |
| 5,762,579 A | 6/1998 | Torii et al. | |
| 5,791,204 A | 8/1998 | Torii et al. | |
| 5,823,905 A | 10/1998 | Torii et al. | |
| 6,158,786 A | 12/2000 | Droste et al. | |
| 6,315,336 B1 * | 11/2001 | Swartzell | 292/201 |
| 6,834,907 B2 | 12/2004 | Dietl | |
| 7,108,299 B2 | 9/2006 | Homann et al. | |
| 7,407,201 B2 | 8/2008 | Pfertner et al. | |

FOREIGN PATENT DOCUMENTS

| | | |
|---|---|---|
| DE | 4111646 A1 | 10/1992 |
| DE | 4419179 A1 | 12/1995 |
| DE | 19601948 A1 | 7/1996 |
| DE | 19603964 A1 | 8/1996 |
| DE | 19702833 A1 | 10/1997 |
| DE | 19854181 A1 | 5/1999 |
| DE | 19909489 A1 | 9/2000 |
| DE | 19944615 A1 | 4/2001 |
| DE | 19964066 A1 | 7/2001 |
| DE | 10105771 A1 | 9/2002 |

(Continued)

*Primary Examiner* — Glenn Dayoan
*Assistant Examiner* — Jason S Daniels
(74) *Attorney, Agent, or Firm* — Brooks Kushman P.C.

(57) ABSTRACT

A locking apparatus for a folding top of a vehicle includes a housing, a locking hook, a coupling device, a driving apparatus, and a sensor. The locking hook has a gripping end and a bearing end. The coupling device is movably mounted in the housing to be horizontally adjustable in a longitudinal direction of the locking hook. The bearing end is movably mounted to the coupling device to be horizontally adjustable with the coupling device in the longitudinal direction of the locking hook between closed and opened positions. The driving arm drives the locking hook to move the locking hook between the closed and opened positions. The sensor is configured to sense when the locking hook is in the closed and opened positions.

19 Claims, 5 Drawing Sheets

(56) References Cited

FOREIGN PATENT DOCUMENTS

| | | |
|---|---|---|
| DE | 10205144 A1 | 8/2003 |
| DE | 10300882 A1 | 7/2004 |
| DE | 10352488 B3 | 7/2005 |
| EP | 0309065 A2 | 3/1989 |
| EP | 0488494 A1 | 6/1992 |
| EP | 0879723 A2 | 11/1998 |
| EP | 1640200 A1 | 3/2006 |
| FR | 2873146 A1 | 1/2006 |

* cited by examiner

LOCKING APPARATUS WITH SENSOR FOR A FOLDING TOP

CROSS-REFERENCE TO RELATED APPLICATIONS

This application claims foreign priority benefits under 35 U.S.C. §119(a)-(d) to DE 10 2010 044 704.8, filed Sep. 8, 2010, which is hereby incorporated by reference in its entirety.

TECHNICAL FIELD

The present invention relates to a locking apparatus for a folding top of a vehicle.

BACKGROUND

DE 103 00 882 A1 (corresponds to U.S. Pat. No. 7,108, 299) describes a locking apparatus for a folding top. The locking apparatus has a locking hook with a front gripping end and a rear bearing end. The bearing end is movably mounted horizontally in a longitudinal direction of the locking hook. The locking apparatus further includes a driving apparatus for moving the locking hook. The driving apparatus includes two four-bar linkages respectively located on opposite sides of the locking hook. The pivoting axes of the control arms extend horizontally such that the locking apparatus requires a relatively large amount of space in order to accommodate the kinematic requirements of the control arms. The locking apparatus may have a sensor to detect closed and opened positions of the locking hook. For this purpose, a horizontally protruding ledge is formed on control arms of one four-bar linkage and cooperates with a switch mounted on the housing.

DE 102 05 144 B4 (corresponds to U.S. Pat. No. 6,834, 907), EP 0 488 494 A1 (corresponds to U.S. Pat. No. 5,058, 939), and DE 103 52 488 B3 describe locking apparatuses in which the locking hook has an adjustable rear bearing end in the longitudinal direction.

DE 199 64 066 A1, EP 0 309 065 A2 (corresponds to U.S. Pat. No. 4,817,999), DE 41 11 646 A1, EP 0 879 723 B1 (corresponds to U.S. Pat. No. 6,158,786), DE 199 44 615 A1, and DE 101 05 771 A1 describe other locking apparatuses in which the locking hook is supported at its rear bearing end by a horizontal pivot axis that can be adjustably pivoted to the housing.

EP 1 640 200 B1 (corresponds to U.S. Pat. No. 7,407,201) and DE 199 09 489 B4 describe locking apparatuses having a position detecting sensor. DE 197 02 833 A1 (corresponds to U.S. Pat. No. 5,762,579), DE 44 19 179 A1, DE 198 54 181 A1, DE 196 03 964 A1 (corresponds to U.S. Pat. No. 5,791, 204) and DE 196 01 948 A1 (corresponds to U.S. Pat. No. 5,823,905) describe position detecting sensors from different areas of technology.

SUMMARY

An object of the present invention includes a locking apparatus for a folding top in which the locking apparatus has high reliability and a compact structural form.

In carrying out the above object and other objects, the present invention provides a locking apparatus for a folding top of a vehicle. The locking apparatus includes a housing, a locking hook, a driving apparatus, and a sensor. The locking hook has a gripping end and a bearing end. The bearing end is movably mounted in the housing to be horizontally adjustable in a longitudinal direction of the locking hook such that the locking hook is movable between closed and opened positions. The driving apparatus has a driving arm and a crank mechanism. The crank mechanism has a crank that is arranged eccentric to an axis of rotation and is rotationally adjustable around the axis of rotation. The crank is connected with the driving arm such that the crank actuates the driving arm while rotating around the axis of rotation. The driving arm is configured to drive the locking hook to move the locking hook between the closed and opened positions upon the driving arm being actuated by the crank. The sensor is configured to cooperate with the crank mechanism to sense when the locking hook is in the closed and opened positions.

An embodiment of the present invention provides a locking apparatus for a folding top of a vehicle. The locking apparatus includes a housing, a locking hook, a driving apparatus, and a sensor. The locking hook has a gripping end and a bearing end. The bearing end of the locking hook is movably mounted in the housing to be horizontally adjustable in a longitudinal direction of the locking hook such that the locking hook is movable between closed and opened positions. The driving apparatus is for driving the locking hook to move the locking hook between the closed and opened positions. The sensor is for sensing when the locking hook is in either the closed or opened position. The driving apparatus includes a driving arm and a crank mechanism for actuating the driving arm. The crank mechanism has a crank that is arranged eccentric to an axis of rotation and is rotationally adjustable around the axis of rotation. The crank is operationally connected with the driving arm. The sensor cooperates with the crank mechanism to sense when the locking hook is in either the closed or opened position. The locking apparatus has a compact design and reliable detection of the state can be achieved due to the features of the locking apparatus.

Embodiments of the present invention are directed to a locking apparatus for a folding top of a vehicle in which the locking apparatus includes a locking hook adjustable between closed and opened positions, a driving apparatus equipped with a driving arm for adjusting the locking hook between its closed and opened positions, and a crank mechanism for actuating the driving arm. The crank mechanism has a crank arranged eccentric to an axis of rotation. The crank is rotationally adjustable around the axis of rotation. The driving apparatus is constructed compactly such that the locking apparatus has a relatively flat overall shape. A sensor is arranged in the region of the crank mechanism to detect the closed and opened positions of the locking hook. The sensor cooperates with the crank mechanism in order to detect the position of the locking hook. In doing so, embodiments of the present invention make use of the knowledge that a geometrically simple kinematic system is present in the region of the crank mechanism which makes detection easier. The cost of implementing the sensor can thus be reduced accordingly.

According to an embodiment, the crank mechanism has a rotationally adjustable plate around its axis of rotation on which the crank is mounted. The sensor includes a switching gate that is arranged in a rotationally fixed manner on the plate. The sensor further includes first and second switches that are arranged on the housing at a fixed distance from one another. The switching gate and the switches are matched to one another so that the switching gate actuates the first switch when the locking hook is in the closed position and actuates the second switch when the locking hook is in the opened position. This design has a geometrically simple structure which assures a comparatively high degree of reliability.

According to an embodiment, the switching gate is arranged axially on the plate. The plate forms an integral component of the crank mechanism. The plate is fabricated separately from the switching gate. The plate is circumferentially enclosed by a housing for the crank mechanism.

According to an embodiment, the switching gate has a circular arc shaped outer contour pointing radially outwardly between its peripheral ends, from which the peripheral ends protrude radially in the outward direction. The switches are positioned so that a peripheral end of the switching gate actuates the one switch when the locking hook is in the closed position and the other peripheral end of the switching gate actuates the other switch when the locking hook is in the opened position. By the circumferential distance between the two peripheral ends and the circumferential distance between the two switches, the angular region through which the plate and thereby also the crank are turned allows for relatively precisely setting the locking hook between the closed and open positions.

According to an embodiment, the peripheral ends transition to the circular arc shaped outer contour by respective ramp contours. This simplifies the actuation of the respective switches. In addition or alternatively, the circular arc shaped outer contour is coaxially and radially offset inwardly with respect to a circular outer contour of the plate. An undesirable contour on the plate, which could collide with another component of the crank mechanism, is prevented by this type of construction. The peripheral ends of the switching gate close radially flush with the plate on the outside. This design reduces danger from undesirable contours which could collide with a housing of the crank mechanism.

According to an embodiment, the switching gate is sickle shaped and the crank is arranged on the opposite side of the plate with respect to the axis of rotation. The available space on the plate can thus be utilized for accommodating the switching gate. The driving arm is located vertically above the switching gate when the locking apparatus is in the closed position. The shape of the driving arm and the connection of the driving arm to the crank are accomplished so that the switching gate is concealed under the driving arm without colliding with the driving arm.

According to an embodiment, the driving arm is mounted pivotably to the crank around a vertical pivot axis. The driving arm has a nose that projects radially out from the pivot axis. The housing has a stop. The nose of the driving arm comes into contact with the stop when the locking hook is in the closed position. The nose of the driving arm when lying against the stop thereby defines the closed position of the locking hook. Since the closed position of the locking hook is thus defined in the region of the crank, the sensor arranged in the region of the crank operates precisely. The switching gate includes a recess on an inner contour facing toward one of the rotational axes into which the nose dips when the locking hook is in the opened position. This results in a compact design.

According to an embodiment, the driving apparatus is connected to the drive through a coupling device with the bearing end of the locking hook. The bearing end is pivotably mounted around a horizontal pivot axis passing perpendicular to the longitudinal direction of the locking hook and is horizontally adjustable on the housing in the longitudinal direction of the locking hook. That is, the locking hook is pivotably mounted by its rear bearing end about a horizontal pivot axis on the coupling device and is horizontally adjustable relative to the housing through the coupling device that is adjustable longitudinally on the housing. This enables the implementation of a favorable kinematic configuration for the locking hook, wherein frictional forces are reduced through the coupling device which increases the reliability of the locking apparatus.

According to an embodiment, the coupling device is a crosshead that has a cross support and a shaft. The bearing end of the locking hook is mounted pivotably around the horizontal pivot axis on the cross carrier. The shaft is pivotably mounted around a vertical pivot axis to the cross carrier and is connected to the driving apparatus. The drive connection between the drive arm and the coupling device occurs through the vertical shaft in order to be able to adjust the coupling device horizontally relative to the housing. The designations "cross head" and "cross carrier" indicate that the horizontal pivot axis, about which the locking hook is pivotably mounted to the coupling device or to the cross carrier, and the vertical pivot axis, about which the vertical shaft is pivotably mounted to the cross carrier, are oriented essentially perpendicular to one another. Such a cross configuration has a compact design.

According to an embodiment, the coupling device has at least one slider and the housing has at least one guide rail. The guide rail extends horizontally in the longitudinal direction. The slider of the coupling device engages the guide rail and is adjustable along the guide rail. This enables a slider guide to be implemented that operates with low friction and high reliability.

According to an embodiment, the vertical shaft of the crosshead is pivotably mounted on or in first and second sliders around the vertical pivot axis or the vertical shaft is rotationally fixed with reference to the sliders. The sliders are pivotably mounted on the housing around the vertical pivot axis. The vertical shaft of the sliders penetrates and is connected to the drive with a drive mechanism on a side facing away from the cross support. The cross support along with the locking hook mounted on it is located on the guide rail. The drive mechanism of the guide rail is coupled to the crosshead through the vertical shaft. This increases the stability of the slider guide. The vertical shaft may be integrally formed from one piece of material.

According to an embodiment, the housing has two plates that are separated vertically from one another. The coupling device is arranged between the plates of the housing to be horizontally adjustable. The guide rails are respectively formed in the plates. The housing thus has a relatively simple design. In an embodiment, two guide rails are provided that are designed to be parallel to one another respectively in the plates. This results in a stable slider guide insofar as the coupling device is equipped with two sliders that cooperate respectively with the guide rails.

According to an embodiment, the housing has a downward directed exit opening through which the locking hook protrudes from the housing. As a result, the locking hook can grasp a suitable counter piece such as a bracket from below with its forward gripping end during the transition from its opened position to its closed position and then pull the grasped bracket to the rear.

According to an embodiment, the driving apparatus has at least one two-bar linkage. The driving arm is operationally connected with the two-bar linkage. An actuating drive actuates the driving arm. The two-bar linkage has a front control arm and a rear control arm. The front control arm is pivotably mounted to the housing in the front around a front vertical axis. The rear control arm is operationally connected with the bearing end of the locking hook through a coupling device in the rear. The rear control arm is pivotably mounted on the coupling device around a rear vertical pivot axis. Both control arms of the two-bar linkage are pivotably mounted to one another around an intermediate vertical pivot axis between their pivot axes. The driving arm is pivotably mounted on one of the control arms of the two-bar linkage between their pivot axes around another vertical pivot axis. The driving apparatus is constructed relatively compactly in the vertical direction due to the use of vertical pivot axes for the driving arm and the control arms resulting in a relatively flat overall shape. The control arms of the two-bar linkages form an elbow joint. The elbow joint is driven by the driving arm and can transmit relatively large forces to the locking hook in the extended position, especially for the closed position of the locking hook. This simplifies the implementation of an appropriately sized actuating drive and increases the security of the locking apparatus in the closed position of the locking hook.

According to an embodiment, the driving apparatus has first and second two-bar linkages. The second two-bar linkage is located a distance from the first two-bar linkage on or in the housing. The front vertical pivot axes, the rear vertical pivot axes, and the middle vertical pivot axes of the two-bar linkages respectively extend coaxially with respect to one another or coincide. In a variant, the front control arms of the two-bar linkages are connected with one another coaxially in a rotationally fixed manner to the pivot axis and/or the rear control arms of the two-bar linkages are connected with one another coaxially in a rotationally fixed manner to the pivot axis. This results in a stable support of the coupling device on the housing through the two-bar linkages, whereby a reliable adjustability of the coupling device is achieved with respect to the housing.

According to an embodiment, the actuating drive has a crank mechanism for actuating the driving arm. The crank mechanism has a crank that is rotationally adjustable about a vertical axis of rotation which is eccentric to the crank. The driving arm is pivotably mounted distal to the two-bar linkage on the crank about a pivot axis that is coaxially vertical to the crank. Due to this vertically rotating crank mechanism, only a small amount of space is required in the vertical direction. This contributes structurally to the flat design of the locking apparatus. A comparatively large transmission of force to the driving arm, and thereby to the two-bar linkage, can be achieved with the aid of such a crank mechanism, which contributes to the operational reliability of the locking apparatus.

According to an embodiment, the actuating drive has a motor and a transmission coupled to the motor. An output of the transmission drives or forms the crank mechanism. The transmission is a planetary gear transmission, whose sun gear is connected to the motor and whose planet gear carrier or ring gear forms the output that drives or forms the crank mechanism. A worm gear can follow the drive connection between a motor output and the sun gear of the transmission so that the rotor spindle of the motor is oriented at right angles to the rotational axes of the transmission.

According to an embodiment, the control arm of the two-bar linkage assumes a top dead center position when the locking hook is in the closed position. The elbow joint is overloaded in the top dead center position so that tensile forces on the locking hook no longer transmit tensile forces to the driving arm while compression forces are transmitted by the control arms of the two-bar linkage to the driving arm in order to set the locking hook in the opened position. Self-locking of the two-bar linkage results for the top dead center position when the locking hook is in the closed position.

According to an embodiment, the driving apparatus has first and second two-bar linkages. The second two-bar linkage is located a distance from the first two-bar linkage on or in the housing. The respective front vertical pivot axes, rear vertical pivot axes, and middle vertical pivot axes coincide so that identical kinematic relationships result. The front control arm of the two-bar linkages can be coaxial with the front pivot axis and rotationally fixed to one another. In addition or alternatively, the rear control arm of the two-bar linkages can be connected coaxially to the rear pivot axis and rotationally fixed to one another. The reliability of the locking apparatus is improved through the two-bar linkages that act in parallel and the coupling device driven in parallel, since it is possible to achieve horizontal actuation of the coupling device that is almost free of overturning torques.

According to an embodiment, the front control arms of the two-bar linkages are arranged on a common front shaft in a rotationally fixed manner. The front shaft is pivotably mounted on the housing around the front pivot axis. In addition or alternatively, the rear control arms of the two-bar linkages are arranged on a common rear shaft in a rotationally fixed manner. The rear shaft is pivotably mounted on the coupling device around the rear pivot axis. The use of common shafts simplifies the rotationally fixed coupling between the control arms.

According to an embodiment, the housing has two vertically separated plates. The bearing end of the locking hook is located between the plates and is arranged to be horizontally adjustable. The two-bar linkages are arranged on outer sides of the respective plates. This results in a stable support for the two-bar linkages on the housing and to the coupling device on the housing.

Embodiments of the present invention also relate to a convertible vehicle having a folding top and a locking apparatus for the folding top. The folding top is movable between its own closed and opened positions. The locking apparatus is in accordance with embodiments of the present invention. The locking apparatus is configured to lock the folding top in the folding top's closed position. To this end, the locking apparatus is adjustable between its closed and opened positions. After the folding top is moved to the folding top's closed position, the locking apparatus can be moved to its closed position to lock the folding top in the folding top's closed position. The locking apparatus can be arranged on the folding top side so that the locking hook cooperates with a hook on the vehicle side. An example is the locking apparatus being arranged on the roof cap of the folding top on the folding top side which comes to rest on an upper windshield frame when the folding top is in the folding top's closed position.

The terms "horizontal" and "vertical" relate to a typical installation situation for the locking apparatus. The terms "forward" and "rear" relate to the direction of motion of the locking hook such that an extension of the locking hook occurs in the forward direction while a retraction or pulling back of the locking hook occurs toward the rear.

The above features, and other features and advantages of the present invention are readily apparent from the following detailed description thereof when taken in connection with the accompanying drawings. It is understood that the features stated above and to be explained below be used not only in the particular stated combination, but also in other combinations or alone without departing from the scope of the present invention.

Embodiments of the present invention are illustrated in the drawings and explained in greater detail in the following description. Identical, similar, or functionally equivalent components are denoted by the same reference numerals.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1-5, a locking apparatus 1 in accordance with an embodiment of the present invention will be described. Locking apparatus 1 is adjustable (i.e., movable) between closed and opened positions. Locking apparatus 1 is for use with a folding top of a vehicle. In the closed position, locking apparatus 1 is used to lock the folding top in place. When moved out of the closed position, locking apparatus 1 is unlocked from the folding top.

Locking apparatus 1 includes a locking lever hook 2. Locking hook 2 has a front gripping end 3 and a rear bearing end 4.

Locking apparatus 1 further includes a housing 5. Bearing end 4 of locking hook 2 is mounted horizontally to a coupling device 15 in housing 5 such that bearing end 4 can be adjusted longitudinally along locking hook 2 in a horizontal direction 6. The longitudinal direction of locking hook 2 is indicated by a line passing through gripping end 3 and bearing end 4. It is thus the direction in which locking hook 2 extends starting from bearing end 4 in the direction of forward gripping end 3.

Figure 1:
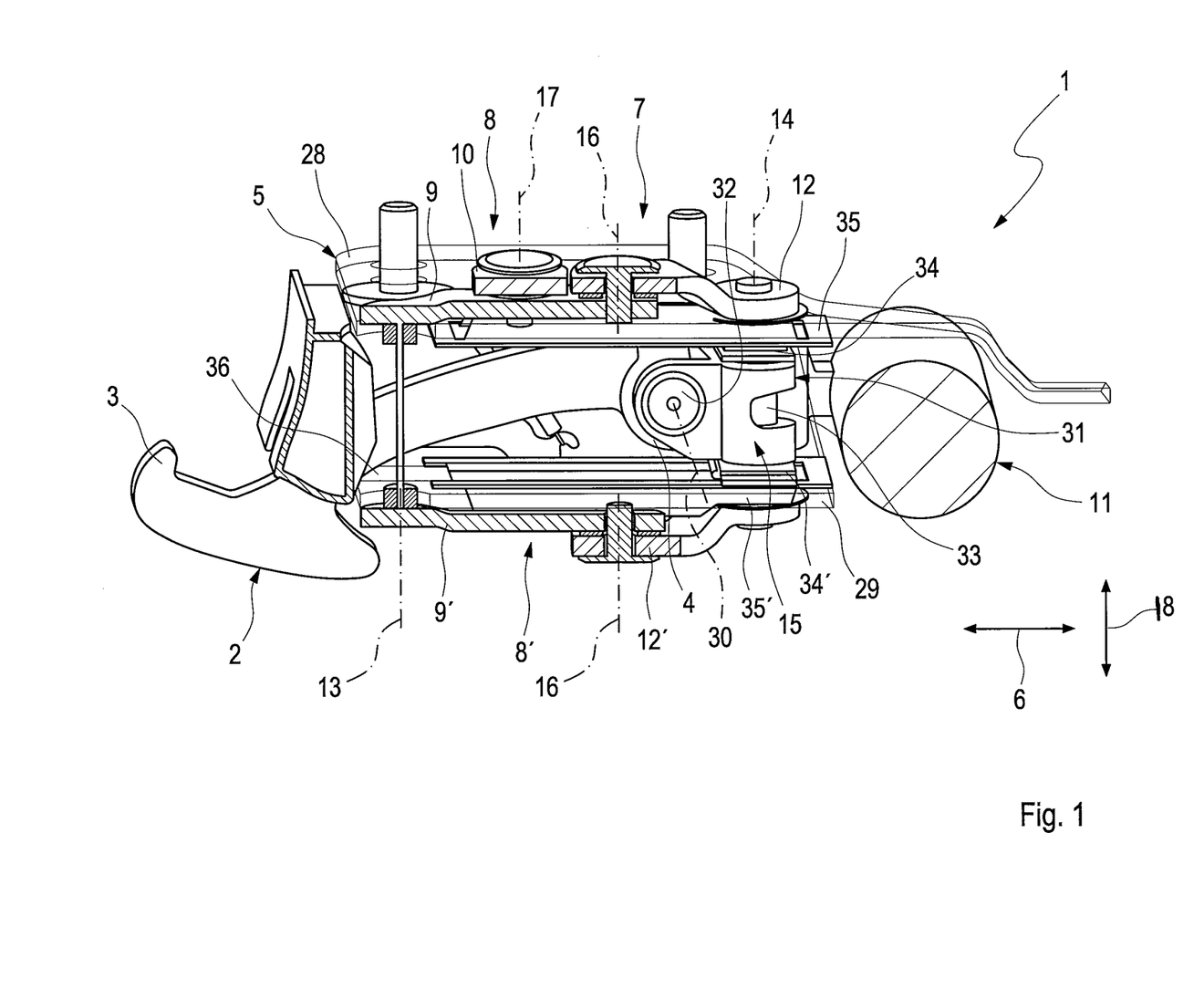
FIG. 1 illustrates a partially sectioned side view of a locking apparatus in accordance with an embodiment of the present invention with the locking apparatus being in a closed position.
Figure 2:
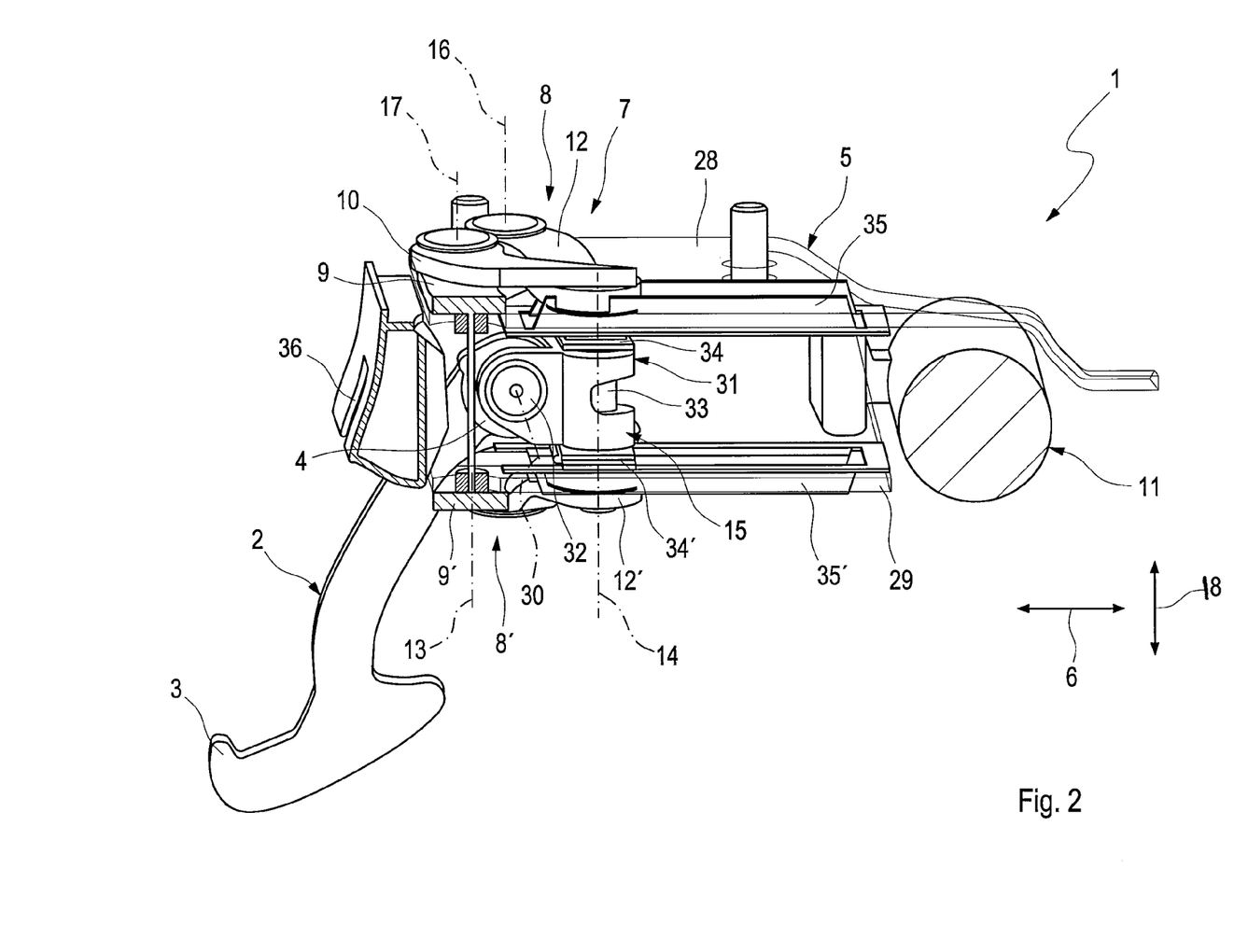
FIG. 2 illustrates a partially sectioned side view of the locking apparatus in an opened position.
Figure 3:
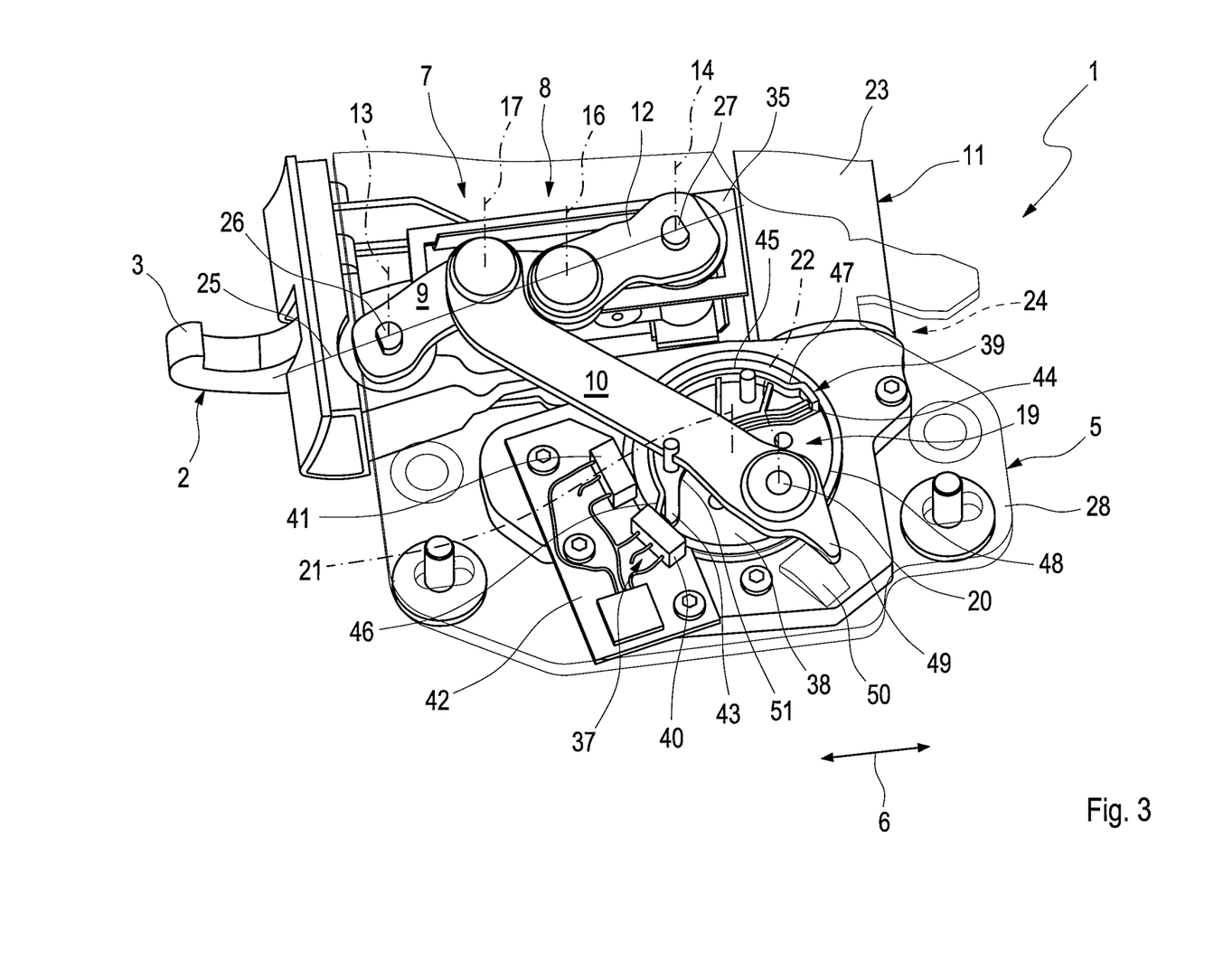
FIG. 3 illustrates a top view of the locking apparatus in the closed position.
Figure 4:
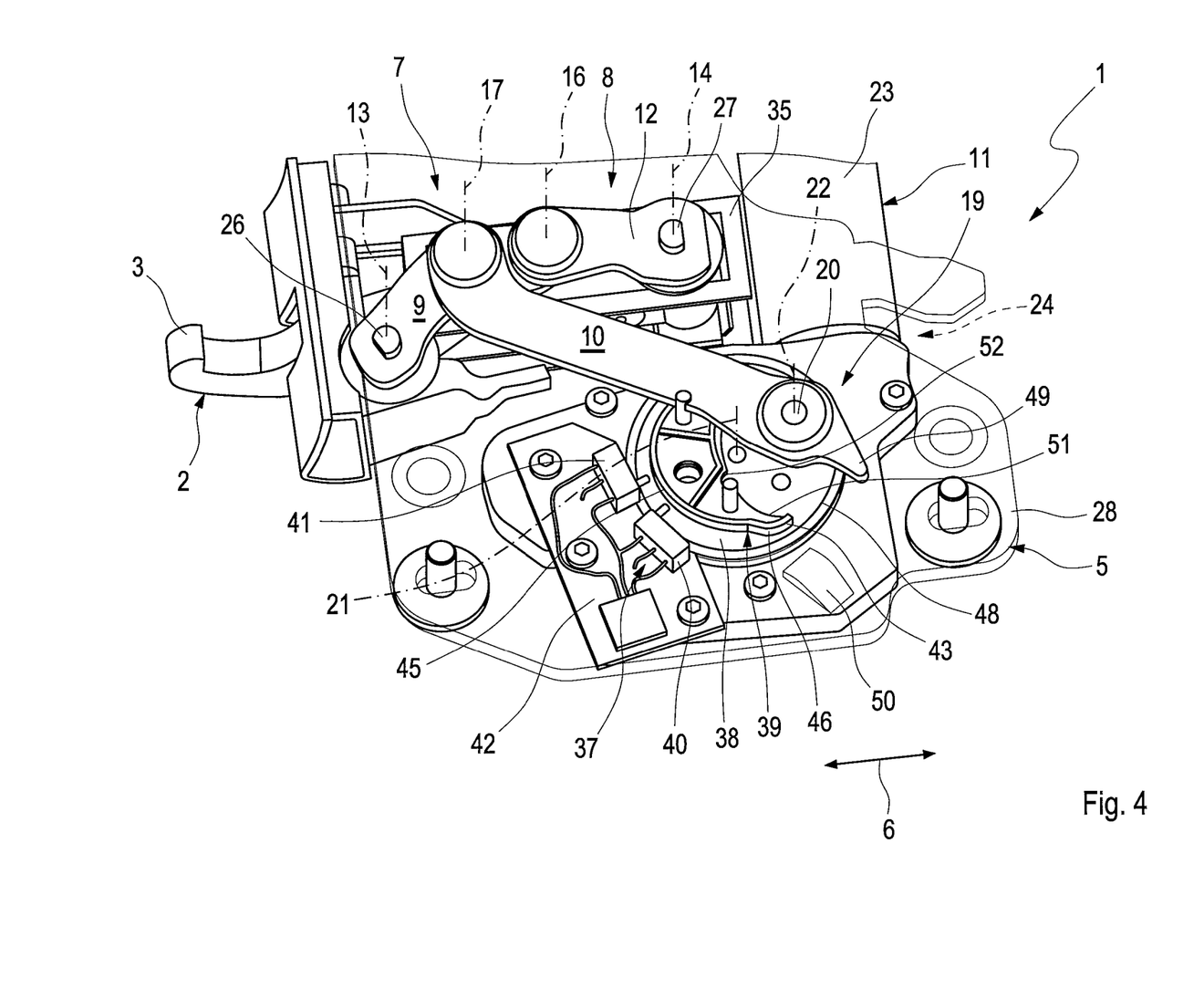
FIG. 4 illustrates a top view of the locking apparatus in an intermediate position.
Figure 5:
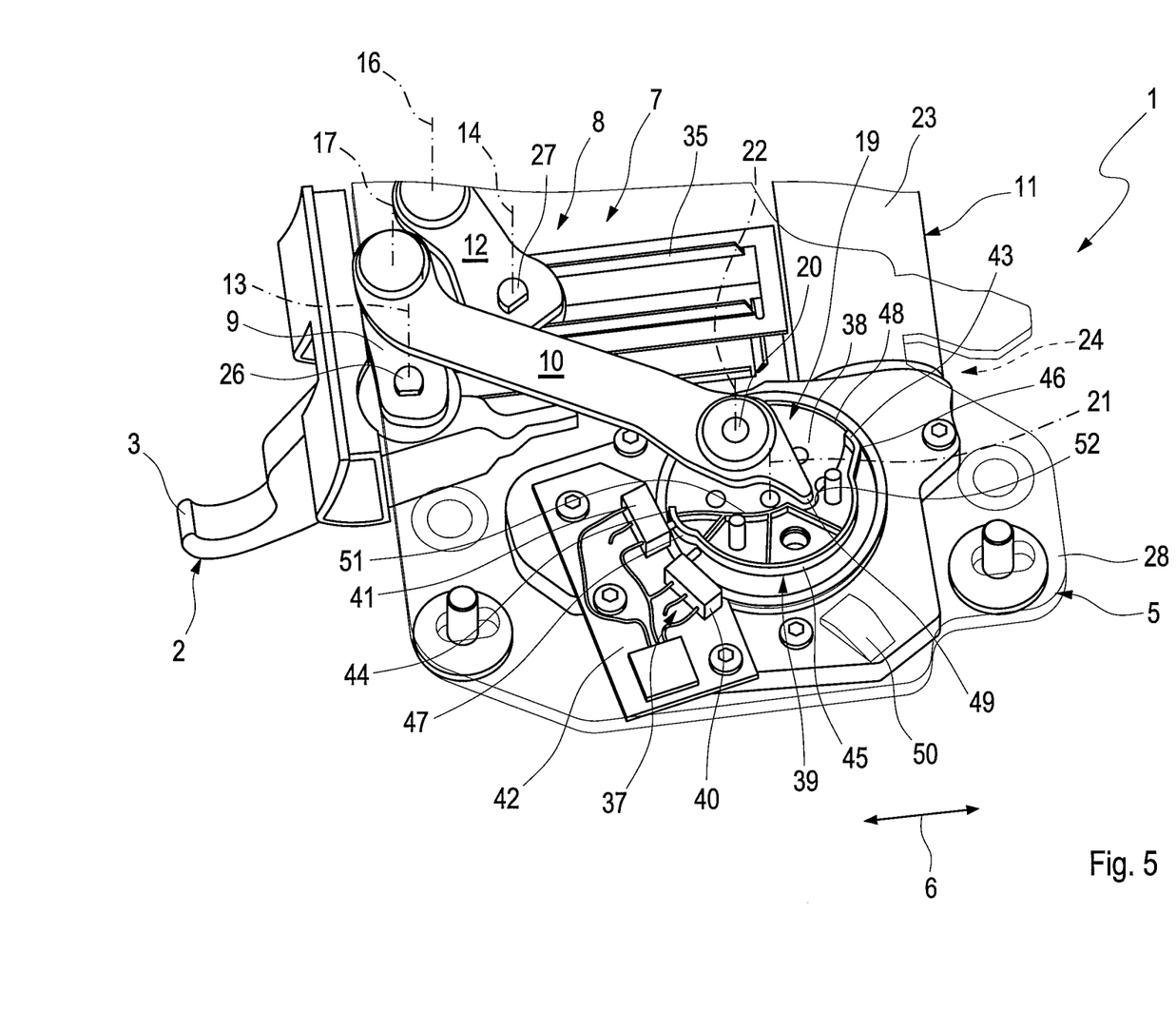
FIG. 5 illustrates a top view of the locking apparatus in the opened position.

Locking apparatus 1 further includes a driving apparatus 7. Driving apparatus 7 is used to adjust (i.e., move) locking hook 2 between the closed and opened positions of locking apparatus 1. FIGS. 1 and 3 show locking apparatus 1 in its closed position. FIGS. 2 and 5 show locking apparatus 1 in its opened position. FIG. 4 shows locking apparatus 1 in an intermediate position between the closed and opened positions.

Driving apparatus 7 includes a first two-bar linkage 8 and a second two-bar linkage 8'. In other embodiments, driving apparatus includes only a single two-bar linkage such as first two-bar linkage 8. Driving apparatus 7 further includes a driving arm 10 and an actuating drive 11. Driving arm 10 is operationally connected with first two-bar linkage 8. Actuating drive 11 is configured to actuate driving arm 10.

First two-bar linkage 8 has a front control arm 9 and a rear control arm 12. Similarly, second two-bar linkage 8' has a front control arm 9' and a rear control arm 12'. Both front control arms 9, 9' are pivotably mounted in the forward direction by a front vertical pivot axis 13 on housing 5. Both rear control arms 12, 12' are pivotably mounted at the rear about a rear vertical pivot axis 14 to coupling device 15. Both rear control arms 12, 12' are operationally connected to bearing end 4 of locking hook 2 through coupling device 15.

The first control arm 9, 12 of first two-bar linkage 8 and the second control arm 9', 12' of second two-bar linkage 8' are pivotably mounted to one another between their pivot axes 13, 14 about an intermediate vertical pivot axis 16. The two control arms 9, 12 and 9', 12' thereby respectively form an elbow joint whose elbow lies in the region of intermediate pivot axis 16.

Driving arm 10 can be pivotably mounted on one of control arms 9, 9', 12, 12' of one of two-bar linkages 8, 8' between pivot axes 13, 14, 16 of the respective control arm 9, 9', 12, 12' about another vertical pivot axis 17. In this embodiment, driving arm 10 is pivotably mounted on front control arm 9 of first two-bar linkage 8 between front pivot axis 13 and intermediate pivot axis 16.

As shown in FIGS. 3-5, actuating drive 11 of driving apparatus 7 includes a crank mechanism 19. Actuating drive 11 drives driving arm 10 of driving apparatus 7, and thereby drives two-bar linkages 8, 8', via crank mechanism 19. Crank mechanism 19 includes a crank 20. Crank 20 can thereby be adjusted rotationally about a rotational axis 21. Rotational axis 21 is eccentrically arranged with respect to crank 20. Driving arm 10 is distal to first two-bar linkage 8 and is pivotably mounted and separated with respect to two-bar linkage 8 on crank 20 about a vertical pivot axis 22. Vertical pivot axis 22 extends coaxially to crank 20.

Actuating drive 11 of driving apparatus 7 further includes a motor 23, such as an electric motor, and an operationally connected transmission 24. An output of transmission 24 drives crank mechanism 19. Alternatively, the output of transmission 24 itself forms crank mechanism 19. Transmission 24 can be a planetary gear transmission whose sun gear is operationally connected to motor 23, either directly or indirectly through a worm gear. A planet gear carrier or a ring gear of transmission 24 thus forms the actuator of transmission 24 that forms or drives crank mechanism 19.

As shown in the top view of FIG. 3, in the closed position of locking apparatus 1, control arms 9, 12 of first two-bar linkage 8 assume a top dead center position for first two-bar linkage 8. Likewise, control arms 9', 12' of second two-bar linkage 8' assume a top dead center position for second two-bar linkage 8'. In the top dead center position, intermediate pivot axis 16 is located on a side of an imaginary line 25 facing toward crank mechanism 19. Imaginary line 25 extends perpendicular through front pivot axis 13 and rear pivot axis 14. Away from the closed position of locking apparatus 1, intermediate pivot axis 16 is located on a side of imaginary line 25 facing away from crank mechanism 19.

As indicated, driving apparatus 7 can function with a single two-bar linkage 8. However, in this embodiment, driving apparatus 7 includes such two-bar linkages 8, 8'. Two-bar linkages 8, 8' are identical and are separated from one another along vertical direction 18 at or in housing 5. Two-bar linkages 8, 8' are coupled together. As such, first two-bar linkage 8 is directly driven by driving arm 10 and drives second-two bar linkage 8' when driven.

In order to operationally couple two-two bar linkages 8, 8' with one another, front control arms 9, 9' are connected with one another coaxially in a rotationally fixed manner to front pivot axis 13. Front control arms 9, 9' are pivotably mounted on housing 5 by a common front shaft 26 extending coaxially to front pivot axis 13. Similarly, rear control arms 12, 12' are connected with one another coaxially in a rotationally fixed manner to rear pivot axis. Rear control arms 12, 12' are connected in a rotationally fixed manner by a common rear shaft 27 extending coaxially to rear pivot axis 14. Rear control arms 12, 12' are pivotably mounted to coupling device 15 around rear pivot axis 14 through rear shaft 27.

Housing 5 includes two vertically separated plates 28, 29. Bearing end 4 of locking hook 2 is arranged in a horizontally adjustable manner between plates 28, 29. Both two-bar linkages 8, 8' are located on two outer sides of plates 28, 29 facing away from one another while bearing end 4 is located between two inner sides of plates 28, 29 facing one another.

Driving apparatus 7 is operationally connected through coupling device 15 with bearing end 4 of locking hook 2. Bearing end 4 of locking hook 2 is pivotably mounted to coupling device 15 around a horizontal pivot axis 30. Horizontal pivot axis 30 is oriented perpendicular to the longitudinal direction of locking hook 2. Coupling device 15 is adjustably mounted horizontally on housing 5 in the longitudinal direction of locking hook 2. Therefore, locking hook 2 is not mounted directly on housing 5 at its bearing end 4. Rather, locking hook 2 is mounted indirectly through coupling device 15 so that locking hook can pivot about pivot axis 30 and can be adjusted along horizontal direction 6.

Coupling device 15 is designed as a crosshead. Coupling device 15 has a cross support 31 on which bearing end 4 of locking hook 2 is pivotably mounted on a pivot bearing 32 about horizontal pivot axis 30. Crosshead 15 has a vertical shaft 33 that is pivotably mounted around rear vertical pivot axis 14 on cross support 31. Coupling device 15 is operationally connected with driving apparatus 7 by vertical shaft 33. Vertical shaft 33 can include rear shaft 27, which is suitable for the transmission of horizontal forces oriented in the longitudinal direction of locking hook 2, along with respective rear control arm 12.

Coupling device 15 further includes first and second sliders 34, 34'. Sliders 34, 34' act in parallel. Housing 5 has guide rails 35, 35' which respectively correspond to sliders 34, 34'. Guide rails 35, 35' extend horizontally in the longitudinal direction of locking hook 2. Sliders 34, 34' are pivotably arranged in the respective guide rails 35, 35'. Sliders 34, 34' and guide rails 35, 35' are designed two-dimensionally or bi-directionally. Vertical shaft 33 in or on sliders 34, 34' is pivotably mounted about rear vertical pivot axis 14. In an alternative embodiment, vertical shaft 33 is arranged to be rotationally fixed with respect to sliders 34, 34', wherein sliders 34, 34' are pivotably mounted about rear vertical pivot axis 14 on housing 5.

Vertical shaft 33, or a section of vertical shaft 33 forming rear shaft 27, crosses sliders 34, 34' and is operationally connected with driving apparatus 7 on the side turned away from cross support 31. Rear shaft 27 is integrally molded to vertical shaft 33. Vertical shaft 33 can be fabricated integrally from one piece with sliders 34, 34'.

Insofar as housing 5 has two vertical plates 28, 29 separated from one another, coupling device 15 is arranged to be horizontally adjustable between plates 28, 29. Guide rails 35, 35' are thus formed in plates 28, 29 so that each plate 28, 29 has one such guide rail 35, 35'. Both guide rails 35, 35' thereby extend parallel to one another and in a straight line.

Housing 5 is equipped in front with an exit aperture 36. Locking hook 2 passes through exit aperture 36 such that locking hook 2 extends out from housing 5 at least with its front gripping end 3. When locking hook 2 is moved from the closed position into the opened position, bearing end 4 of locking hook 2 moves from a retracted rear position (shown in FIG. 1) in the forward direction to a front position (shown in FIG. 2). In this case, locking hook 2 is extended in the forward direction through exit aperture 36. When retracting from the opened position to the closed position, locking hook 2 again passes or retracts through exit aperture 36 in housing 5 toward the rear.

As shown in FIGS. 3-5, locking apparatus 1 further includes a sensor 37. Sensor 37 is configured to detect for whether locking hook 2 is in the closed position or opened position. Sensor 37 cooperates with crank mechanism 19 of locking apparatus 1 in order to detect the position of locking hook 2. The components of sensor 37 are arranged in the region of crank mechanism 19 for this purpose.

Crank mechanism 19 includes a plate 38 that can be rotationally adjusted about rotational axis 21 on which crank 20 is located. Crank 20 can thus be mounted in a rotationally fixed manner to plate 38 depending on the coupling between crank 20 and the driving lever. Crank 20 can be mounted to plate 38 in a rotational manner around its axis of rotation 22.

Sensor 37 has a switching gate 39. Switching gate 39 is located in a rotationally fixed manner on plate 38 and has first and second switches 40, 41. Both switches 40, 41 are arranged at a distance from one another in the circumferential direction of plate 38 and are fixed in place with respect to housing 5. For example, switches 40, 41 are placed on a printed circuit board 42 mounted to housing 5. Switching gate 39 and switches 40, 41 are matched to one another so that switching gate 39 actuates switches 40, 41. Thus, switching gate 39 actuates first switch 40 in the closed position of the locking hook 2 shown in FIG. 3 and actuates second switch 41 in the opened position of locking hook 2 shown in FIG. 5.

Switching gate 39 is located on plate 38 with respect to the axis of rotation 21. Switching gate 39 is sickle shaped and extends in the circumferential direction of plate 38. Switching gate 39 has correspondingly two peripheral ends (first peripheral end 43 and second peripheral end 44). Switching gate 39 is located on plate 38 relative to rotational axis 21 opposite crank 20. Thus, crank 20 and switching gate 39 lie on plate 38 relative to one another diametrically opposed to rotation axis 21.

Switching gate 39 has a radial outer shape between its peripheral ends 43, 44. In particular, switching gate 39 has a circular arc shaped outer contour 45 that protrudes radially outwardly from peripheral ends 43, 44. Peripheral ends 43, 44 are used to actuate switches 40, 41. First peripheral end 43 actuates first switch 40 in the closed position according to FIG. 3. Second peripheral end 44 actuates second switch 41 in the opened position according to FIG. 5.

Peripheral ends 43, 44 transition respectively into the circular arc shaped outer contour 45 by respective ramp contours 46, 47. Ramp contours 46, 47 simplify the actuation of respective switches 40, 41. Peripheral ends 43, 44 terminate radially outwardly and are flush with plate 38, which has a circular outer contour 48. Circular outer contour 45 of switching gate 39 is correspondingly displaced coaxially and radially toward the inside with respect to circular outer contour 48 of plate 38.

As shown in FIGS. 3 and 4, the connection between driving arm 10 and crank 20 is such that switching gate 39 can be inserted below driving arm 10. For example, driving arm 10 is offset for this purpose in order to create a vertical space between driving arm 10 and switching gate 39.

Driving arm 10 is mounted pivotably on crank 20 about vertical pivot axis 22, which is coaxial with crank 20. Driving arm 10 has a radially protruding nose 49 with respect to rotation axis 22. Nose 49 lies correspondingly distal to the associated first two-bar linkage 8 of driving arm 10. Housing 5 has a stop 50 at which nose 49 rests upon when locking apparatus 1 reaches the closed position according to FIG. 3. Stop 50 correspondingly defines the closed position of locking apparatus 1. Switching gate 39 has a recess 52 on an inner contour 51 facing toward rotation axis 21 of plate 38, which can be seen in FIGS. 4 and 5. Nose 49 dips into recess 52 when nose 49 reaches the opened position of locking hook 2 according to FIG. 5.

Locking apparatus 1 presented herein may be used in a motor vehicle that has a folding top in which the folding top is movable between folding top closed and opened positions.

Locking 1 is used for closing or locking the folding top in its closed position. Two or more such locking apparatuses (for instance, one on each longitudinal side of the folding top) can be used together. For example, the folding top can have a roof cap on a front end that precedes during the closing process on which at least one such locking apparatus 1 is arranged. The roof cap comes to rest on an upper windshield frame in the closed position of the folding top. Locking hook 2 thereby grips a bracket or the like provided on the windshield frame. Locking apparatus 1 is thus located on the folding top side. This solution is favored by the flat or compact design in vertical direction 18.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A locking apparatus for a folding top of a vehicle, the locking apparatus comprising:
   a housing;
   a locking hook having a gripping end and a bearing end;
   a coupling device movably mounted in the housing to be horizontally adjustable in a longitudinal direction of the locking hook;
   wherein the bearing end is movably mounted to the coupling device to be horizontally adjustable with the coupling device in the longitudinal direction of the locking hook between closed and opened positions;
   a driving apparatus having a driving arm and a crank mechanism, wherein the crank mechanism has a crank that is arranged eccentric to an axis of rotation and is rotationally adjustable around the axis of rotation, wherein the crank is connected with the driving arm such that the crank actuates the driving arm while rotating around the axis of rotation, wherein the driving arm is configured to drive the locking hook to move the locking hook between the closed and opened positions upon the driving arm being actuated by the crank; and
   a sensor configured to cooperate with the crank mechanism to sense when the locking hook is in the closed and opened positions.

2. The locking apparatus of claim 1 wherein:
   the crank mechanism further includes a crank plate that is rotationally adjustable around the rotation axis, wherein the crank is mounted on the crank plate;
   wherein the sensor includes a switching gate arranged in a rotationally fixed manner on the crank plate and first and second switches arranged on the housing fixed in position at a distance from one another in the circumferential direction of the crank plate;
   wherein the switching gate actuates the first switch when the locking hook is in the closed position and actuates the second switch when the locking hook is in the opened position.

3. The locking apparatus of claim 2 wherein:
   the switching gate is mounted axially on the crank plate.

4. The locking apparatus of claim 2 wherein:
   the switching gate has an outer contour between first and second peripheral ends;
   wherein the first peripheral end actuates the first switch when the locking hook is in the closed position and the second peripheral end actuates the second switch when the locking hook is in the opened position.

5. The locking apparatus of claim 4 wherein:
   the peripheral ends transform into the outer contour by respective ramp contours.

6. The locking apparatus of claim 4 wherein:
   the outer contour is offset coaxially and radially inwardly compared to an outer contour of the crank plate.

7. The locking apparatus of claim 4 wherein;
   the peripheral ends are radially flush with the crank plate.

8. The locking apparatus of claim 2 wherein:
   the driving arm is located vertically above the switching gate when the locking hook is in the closed position.

9. The locking apparatus of claim 2 wherein:
   the driving arm is mounted pivotably on the crank around a vertical pivot axis and the driving arm has a nose that protrudes radially with respect to the vertical pivot axis;
   wherein the housing includes a stop;
   wherein the nose of the driving arm rests against the stop of the housing when the locking hook is in the closed position.

10. The locking apparatus of claim 9 wherein:
    the switching gate includes a recess on an inner contour facing the axis of rotation into which the nose of the driving arm dips into when the locking hook is in the opened position.

11. The locking apparatus of claim 1 wherein:
    the driving apparatus includes a two-bar linkage, wherein the driving arm is connected with the two-bar linkage;
    wherein the two-bar linkage has a front control arm and a rear control arm, wherein the front control arm is pivotably mounted to the housing around a front vertical pivot axis, wherein the rear control arm is connected with the bearing end of the locking hook through the coupling device and is pivotably mounted on the coupling device around a rear vertical pivot axis;
    wherein the control arms of the two bar-linkage are pivotably mounted to one another between their axes of rotation around an intermediate vertical pivot axis;
    wherein the driving arm is pivotably mounted to one of the control arms between the pivot axes of the control arms around another vertical axis of rotation.

12. A locking apparatus for a folding top of a vehicle, the locking apparatus comprising:
    a housing;
    a locking hook having a gripping end and a bearing end, wherein the bearing end is movably mounted in the housing to be horizontally adjustable in a longitudinal direction of the locking hook such that the locking hook is movable between closed and opened positions;
    a driving apparatus having a driving arm and a crank mechanism, wherein the crank mechanism has a crank that is arranged eccentric to an axis of rotation and is rotationally adjustable around the axis of rotation, wherein the crank is connected with the driving arm such that the crank actuates the driving arm while rotating around the axis of rotation, wherein the driving arm is configured to drive the locking hook to move the locking hook between the closed and opened positions upon the driving arm being actuated by the crank; and
    a sensor configured to cooperate with the crank mechanism to sense when the locking hook is in the closed and opened positions;
    wherein the crank mechanism further includes a crank plate that is rotationally adjustable around the rotation axis, wherein the crank is mounted on the crank plate;

wherein the sensor includes a switching gate arranged in a rotationally fixed manner on the crank plate and first and second switches arranged on the housing fixed in position at a distance from one another in the circumferential direction of the crank plate;

wherein the switching gate actuates the first switch when the locking hook is in the closed position and actuates the second switch when the locking hook is in the opened position;

wherein the switching gate is sickle shaped and is arranged on the crank plate lying opposite with respect to the rotation axis of the crank.

13. A vehicle assembly comprising:

a movable folding top; and a locking apparatus having a housing, a locking hook, a driving apparatus, and a sensor;

wherein the locking hook has a gripping end and a bearing end, wherein the bearing end is movably mounted in the housing to be horizontally adjustable in a longitudinal direction of the locking hook such that the locking hook is movable between closed and opened positions;

wherein the driving apparatus has a driving arm and a crank mechanism, wherein the crank mechanism has a crank that is arranged eccentric to an axis of rotation and is rotationally adjustable around the axis of rotation, wherein the crank is connected with the driving arm such that the crank actuates the driving arm while rotating around the axis of rotation, wherein the driving arm is configured to drive the locking hook to move the locking hook between the closed and opened positions upon the driving arm being actuated by the crank;

wherein the sensor is configured to cooperate with the crank mechanism to sense when the locking hook is in the closed and opened positions;

wherein the locking apparatus and the folding top are arranged such that the locking hook locks the folding top in position when the locking hook is in the closed position.

14. The vehicle assembly of claim 13 wherein:

the crank mechanism further includes a crank plate that is rotationally adjustable around the rotation axis, wherein the crank is mounted on the crank plate;

wherein the sensor includes a switching gate arranged in a rotationally fixed manner on the crank plate and first and second switches arranged on the housing fixed in position at a distance from one another in the circumferential direction of the crank plate;

wherein the switching gate actuates the first switch when the locking hook is in the closed position and actuates the second switch when the locking hook is in the opened position.

15. The vehicle assembly of claim 14 wherein:

the switching gate has an outer contour between first and second peripheral ends;

wherein the first peripheral end actuates the first switch when the locking hook is in the closed position and the second peripheral end actuates the second switch when the locking hook is in the opened position.

16. The vehicle assembly of claim 14 wherein:

the outer contour is offset coaxially and radially inwardly compared to an outer contour of the crank plate.

17. The vehicle assembly of claim 14 wherein:

the switching gate is sickle shaped and is arranged on the crank plate lying opposite with respect to the rotation axis of the crank.

18. The vehicle assembly of claim 14 wherein:

the driving arm is mounted pivotably on the crank around a vertical pivot axis and the driving arm has a nose that protrudes radially with respect to the vertical pivot axis;

wherein the housing includes a stop;

wherein the nose of the driving arm rests against the stop of the housing when the locking hook is in the closed position.

19. The vehicle assembly of claim 18 wherein:

the switching gate includes a recess on an inner contour facing toward the axis of rotation into which the nose of the driving arm dips into when the locking hook is in the opened position.

* * * * *